United States Patent
White et al.

(10) Patent No.: US 10,140,482 B2
(45) Date of Patent: Nov. 27, 2018

(54) RFID SCHEME IN HARSH ENVIRONMENTS

(71) Applicants: Roy E. White, Longmont, CO (US); Scott David Dalgleish, Boulder, CO (US); Richard Stephen Pollack, Boulder, CO (US)

(72) Inventors: Roy E. White, Longmont, CO (US); Scott David Dalgleish, Boulder, CO (US); Richard Stephen Pollack, Boulder, CO (US)

(73) Assignee: Phase IV Engineering Inc., Boulder, CO (US)

( * ) Notice: Subject to any disclaimer, the term of this patent is extended or adjusted under 35 U.S.C. 154(b) by 0 days.

(21) Appl. No.: 15/730,534

(22) Filed: Oct. 11, 2017

(65) Prior Publication Data

US 2018/0285605 A1    Oct. 4, 2018

Related U.S. Application Data

(60) Provisional application No. 62/407,310, filed on Oct. 12, 2016.

(51) Int. Cl.
| | |
|---|---|
| *G06K 7/10* | (2006.01) |
| *G06K 19/077* | (2006.01) |
| *H04Q 9/00* | (2006.01) |
| *G06K 7/00* | (2006.01) |
| *G06K 19/073* | (2006.01) |

(52) U.S. Cl.
CPC ..... *G06K 7/10108* (2013.01); *G06K 7/10316* (2013.01); *G06K 19/07771* (2013.01); *H04Q 9/00* (2013.01); *G06K 7/0008* (2013.01); *G06K 7/10198* (2013.01); *G06K 19/07309* (2013.01); *H04Q 2209/47* (2013.01)

(58) Field of Classification Search
CPC .......... G06K 7/10108; G06K 7/10198; G06K 7/10816; G06K 7/0008; G06K 19/07771; G06K 19/07309; G06K 19/0723; G06K 7/10316; H04Q 9/00; H04Q 2209/47; G06Q 10/083; G08B 27/003
USPC ................................................. 340/10.1, 5.1
See application file for complete search history.

(56) References Cited

U.S. PATENT DOCUMENTS

| | | | |
|---|---|---|---|
| 9,361,568 B2 * | 6/2016 | Butler ................. | H04L 67/1097 |
| 2018/0204029 A1 * | 7/2018 | Butler .............. | G06K 19/07309 |

* cited by examiner

*Primary Examiner* — Ali Neyzari
(74) *Attorney, Agent, or Firm* — Kenneth Altshuler

(57) ABSTRACT

A method for using an RFID tag to retain information of an environment, such as high temperature, that is beyond the operable limits of the RFID tag. The method generally comprises providing an RFID tag that has nonvolatile RFID memory that can communicate with an RFID interrogator system. Exposing the RFID tag to a first environment (such as a high temperature) that renders the RFID tag inoperable. Collecting a first sensor value of the first environment and storing the first sensor value in nonvolatile memory accessible by the RFID interrogation system. Later, exposing the RFID tag and the sensor to a second environment that renders the RFID tag operable (such as room temperature). Wirelessly transmitting the first sensor value to the RFID tag via the RFID interrogator system while the first sensor is in the second environment, and storing the first sensor value in the nonvolatile RFID memory while the RFID tag is in the second environment.

20 Claims, 5 Drawing Sheets

RFID SCHEME IN HARSH ENVIRONMENTS

CROSS-REFERENCE TO RELATED APPLICATIONS

This application is a non-provisional application which claims priority to and the benefit of U.S. Provisional Patent Application Ser. No. 62/407,310, entitled RFID SCHEME IN HARSH ENVIRONMENTS filed Oct. 12, 2016, the entire disclosure of which is hereby incorporated by reference.

FIELD OF THE INVENTION

The present invention relates generally to systems and methods of recording parameters to memory in RFID tags affixed to objects exposed to extreme environments that are beyond operability of the RFID tags.

DESCRIPTION OF RELATED ART

Radio Frequency IDentification (RFID) systems are used in libraries and retail stores like Home Depot. Special RFID tags are placed on books and expensive tools. When the book or tool passes by an RFID reader, the identification of the book or tool is read by the reader using radio waves. One unique aspect of RFID technology is that an identification number and other digital data in the tag can be transmitted wirelessly using radio energy from an RFID tag, without any battery in the RFID tag. This particular kind of RFID tag is considered a passive RFID tag because it is powered from radio wave energy. In contrast, active RFID tags are generally powered through small batteries.

An example of a passive RFID tag arrangement is illustratively shown in FIG. 1. In this arrangement, the RFID tag 100 harvests electromagnetic waves, or radio energy 108, provided by a reader 110 (sometimes called an interrogator) when the RFID tag 100 is within range of ample radio wave power provided by the reader. This is often referred to as the interrogation zone. The interrogation zone is the physical distance within which the strength of the electromagnetic waves 108 generated by the reader is able to power the RFID tag 100 and receive signals 112 from the tag 100. The radio energy 108 is harnessed by way of an antenna 102 that powers a chipset 104. The chipset 104 possesses, among other things, communication capability, memory, and in some cases a transducer to measure a physical effect, such as temperature and pressure, for example ("RFID Sensor"). The RFID reader 110 (interrogator) acts as a master for the RFID tag 100 and a slave for an application host (not shown). Typically, an RFID tag is designed so that data can be written and read from the tag, typically which varies between 32 bits and 32,000 bytes of data.

In library books, the tag may be programmed with its ISBN number. In retail stores, the product ID may be the product's UPC code. In more sophisticated RFID memory tags, other data such as price or weight or expiration date may be programmed into the tag's extended memory using the wireless connection from the reader.

As the name implies, RFID systems were designed to transmit Identification information by way of radio frequency. The data is always transmitted digitally so that the user of the data gets an exact string of data. For example if the tag ID# is "16" the tag will transmit a digital signal of 001-110, which translates to "1" and "6" in digital ("1" or "0") signals that are wirelessly transmitted.

Once the RFID reader gets the ID number from the tag, the reader will send the data to a computer database. For example, when the person holding a book walks by the RFID reader at the entrance of the library, the ID number will be read from the book and sent to a library data base where it can be determined if the book leaving the library was checked-out or not. Actions from the data base host computer, such as triggering an alarm, can be taken if the book leaving the library was not checked-out, for example.

The reader sends the ID data to the database using a standard digital protocol such as RS232 or Ethernet. "1" and "0" signals are sent over a wire to the computer data base to transmit the ID number from the RFID reader to the computer data base.

There are, however, limits to the uses of RFID sensors. One such limit includes extreme environmental conditions, such as elevated temperatures, wherein an RFID sensor is dysfunctional or simply inoperable.

It is to innovations related to this subject matter that the claimed invention is generally directed.

SUMMARY OF THE INVENTION

The present invention relates generally to systems and methods of recording parameters to RFID sensors affixed to objects exposed to extreme environments that are beyond operability of the RFID sensors. The present embodiments generally relate to an RFID apparatus comprising a sensing system that includes an RFID tag possessing nonvolatile RFID memory and a sensor linked with an RFID interrogator system. The RFID interrogator system includes a microprocessor, sensor reader, real time clock, timer, non-volatile interrogator memory and an RFID antenna. The non-volatile interrogator memory containing a value sensed by the sensor obtained while the RFID tag was disposed in a first environment that renders the RFID tag inoperable. The non-volatile RFID memory containing the value obtained from the RFID interrogator system only after the RFID tag was disposed in a second environment wherein the RFID tag is operable in the second environment.

Other embodiments of the present invention contemplate a method comprising providing a sensor, real time clock, and timer linked with an RFID interrogator system and an RFID tag possessing nonvolatile RFID memory; exposing the RFID tag to a first environment that renders the RFID tag inoperable; collecting a first sensor value of the first environment via the sensor; storing the first sensor value in nonvolatile memory comprised by the RFID interrogation system; exposing the RFID tag to a second environment that renders the RFID tag operable; wirelessly transmitting the first sensor value from the RFID interrogator system to the RFID tag when the RFID tag is in the second environment; and storing the first sensor value in the nonvolatile RFID memory while the RFID tag is in the second environment.

Certain other embodiments envision a method comprising providing an RFID interrogator system including a sensor, a timer device; providing an RFID tag possessing nonvolatile RFID memory; disposing the RFID tag on a tool; immersing the tool in an environment that is so hot, the RFID tag is nonfunctional; measuring the temperature of the hot environment; storing to nonvolatile data memory accessible by the RFID interrogator system the temperature along with the time elapsed (as measured by the timer device) the tool is in the hot environment; and transmitting the temperature and elapsed time to the nonvolatile RFID memory when the tool is brought to a temperature where the RFID tag is functional.

DETAILED DESCRIPTION

Figure 1:
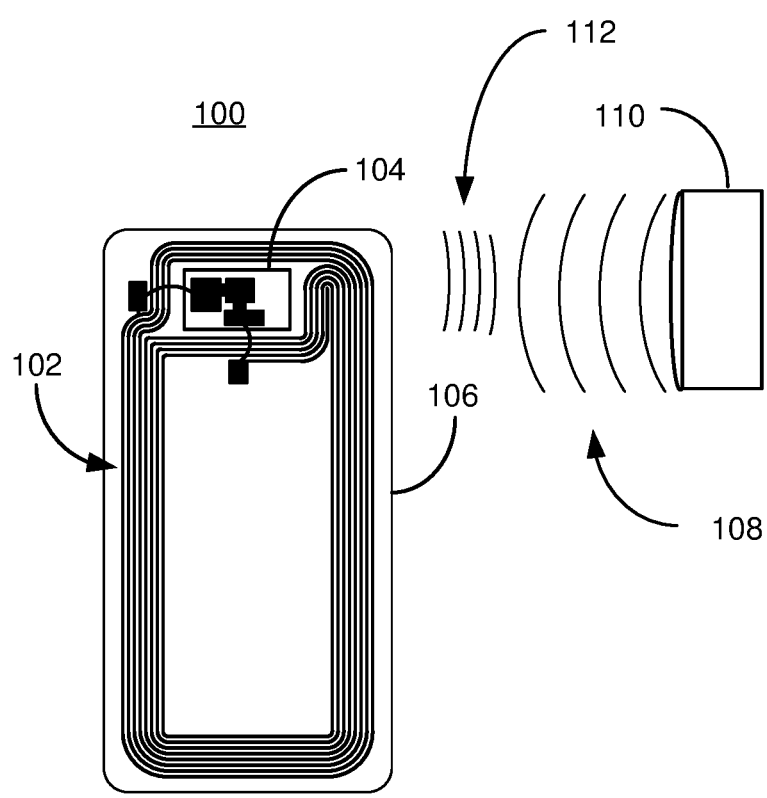
FIG. 1 shows a prior art image of an RFID tag.

Initially, this disclosure is by way of example only, not by limitation. Thus, although the instrumentalities described herein are for the convenience of explanation, shown and described with respect to exemplary embodiments, it will be appreciated that the principles herein may be applied equally to various RFID tags exposed to a variety of environments that exceed operability of RFID tags. In what follows, similar or identical structures may be identified using identical callouts.

In certain instances, object/s, such as a tool, may intentionally or unintentionally be exposed to extreme environments momentarily or for prolonged periods of time. For purposes of record keeping, it may be desirable to record data associated with the object/s in the extreme environment. An extreme environment can be an elevated temperature or extreme cold or something undergoing high pressure or accelerations, just to name several examples. Extreme environments as used in this disclosure is considered an environment that prohibits the functionality of an RFID sensor from at least one of if not all of, receiving, storing, or transmitting data but where the extreme environment does not exceed the memory retention specifications for the tag. Examples of a record associated with the object/s can include the amount of time at the extreme environment, how the extreme environment changes over time, etc. Naturally, this kind of data can be retained in non-volatile memory of a computer or even on a pad of paper or scientific notebook. Regardless of the method of retaining the data, it needs to somehow be tied back to the object exposed to the extreme environment. On occasion the data taken may not correspond with an object/s because of poor record-keeping or the data is lost. In circumstances where object/s are moved to various locations, recalling the data and comparing with some sort of indicia, such as a serial number, can be a nuisance. Certain embodiments described herein address these problems by storing the data associated with the extreme environment to RFID tag memory disposed on or integrated with an object after the extreme environmental condition is gone. More specifically, the data can be stored to memory integrated in an RFID chip attached to or integrated in an object. The data can then be recalled from the object via an RFID reader at virtually any location eliminating the need for lookup tables and external records. In other words, the extreme environmental conditioning data follows the object. However, as mentioned, in extreme environments an RFID tag may not work properly or may not work at all. To address this problem, certain embodiments envision collecting data of an object subjected to an extreme environment and storing that data on an external medium, such as a computer for example, and then transferring at least a portion of that data (under RFID tag functioning environmental conditions) to the RFID tag memory via an RFID wireless interrogator when the attached tag is no longer in the extreme environment.

Figure 2:
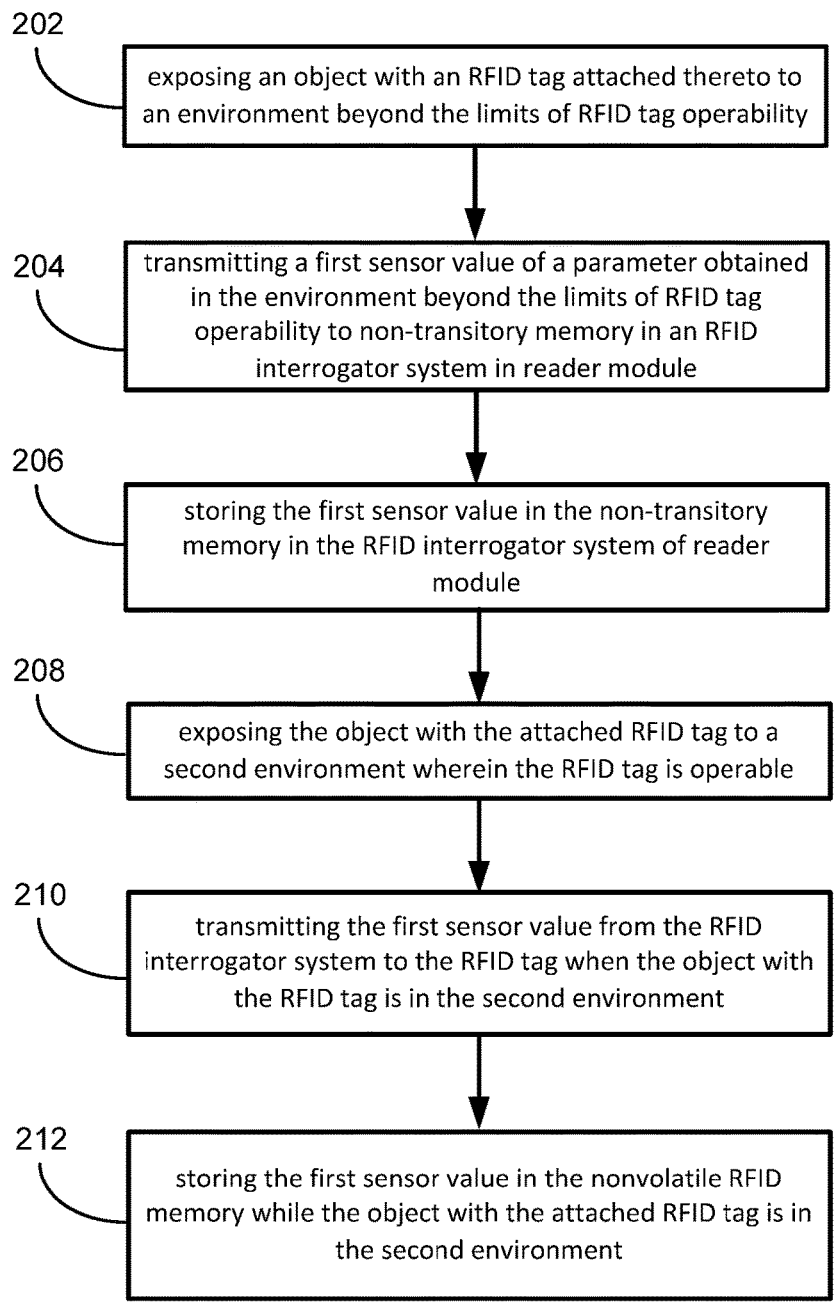
FIG. 2 illustratively depicts a block diagram of method steps that broadly illustrates an embodiment of the present invention.

FIG. 2 is a block diagram of method steps that broadly illustrates an embodiment of the present invention. FIG. 2 is described in conjunction with FIGS. 3A-3C, which illustratively depict an environment in which embodiments of the present invention can be practiced. In this example, the objects are scalpels 330 used in medicine for surgical procedures that are sterilized by being held at elevated temperatures for a minimum amount of time by way of an autoclave 318. Specifically, to prevent infecting a patient during medical procedures, medical tools, such as scalpels 330, are typically held in an oven/autoclave 318 for a period of time at extreme temperatures that kill all infectious viruses, bacteria, and the like. Disposed on each of the scalpels 330 is a passive RFID tag 320 that each possess nonvolatile non-transient solid state memory.

Figure 3A:
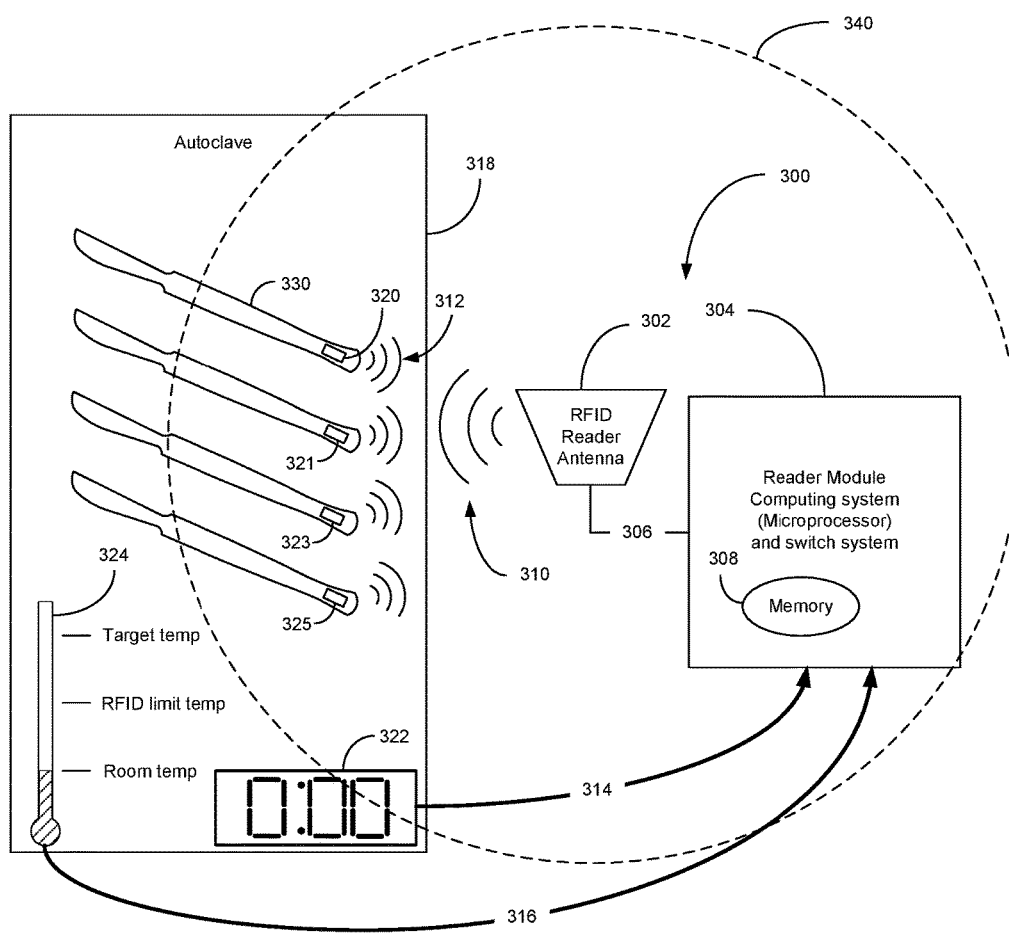
FIGS. 3A-3C depict environments in which embodiments of the present invention can be practiced.

More specifically, after the scalpels 330 are put in an autoclave 318, the autoclave is heated to a target temperature that will destroy all biological material on the scalpels 330. As depicted in FIG. 3A, prior to turning on the autoclave 318, one embodiment contemplates transmitting a start date and time (arrow 314), which can be displayed on a time display 322 viewable on the autoclave 318, to the interrogator computer system 304 that can then be stored into non-transient memory 308. Other embodiments contemplate transmitting a start temperature 316, which can be displayed via a thermometer 324, or other temperature display device, disposed on the autoclave 318, to the interrogator computer system 304 that can also be stored to the non-transient memory 308. Additional embodiments further contemplate start date and time data and/or start temperature data being transmitted from the RFID reader antenna 302 connected to the reader module computing system 304 via radio waves 310 to each of the RFID tags 320. In the present embodiment, the RFID tags 320 are operable at room temperature and are therefore capable of receiving RFID information from the RFID interrogator 300 so long as the RFID tags 320 are within the interrogation zone 340. The interrogation zone 340 depicted by the dashed circle is a region wherein the energy produced by the RFID reader antenna 302 is strong enough to energize the RFID tags 320.

In the present embodiment, there are four RFID tags 320, 321, 323, and 325, one for each scalpel 330 that are within the interrogation zone 340 of the RFID reader antenna 302. Optional embodiments envision multiple RFID tags disposed on each scalpel 330 providing multiple sources of varied information, extra storage, or redundant information if one of the RFID tags malfunctioned. To simplify callouts, RFID tag/s will be generically denoted as element 120. In this embodiment, the reader antenna 302 is integrated 306 with the reader and computing system 304 to generally comprise the interrogator unit/system 300. The reader and computing system 304 possesses the appropriate microprocessor/s (or functional equivalents, such as digital circuitry or a digital state machine), algorithms and non-transitory memory 308, such as volatile or nonvolatile memory (e.g., disk drive, solid state memory, etc.). Each RFID tag 320 is equipped with an antenna, non-volatile memory and the appropriate circuitry and algorithms to function as an RFID tag. When interrogated by the RFID reader antenna 302, each RFID tag 320 will send a unique ID/serial number (different for each RFID tag 320) and, optionally, other data stored to the nonvolatile RFID memory.

Figure 3B:
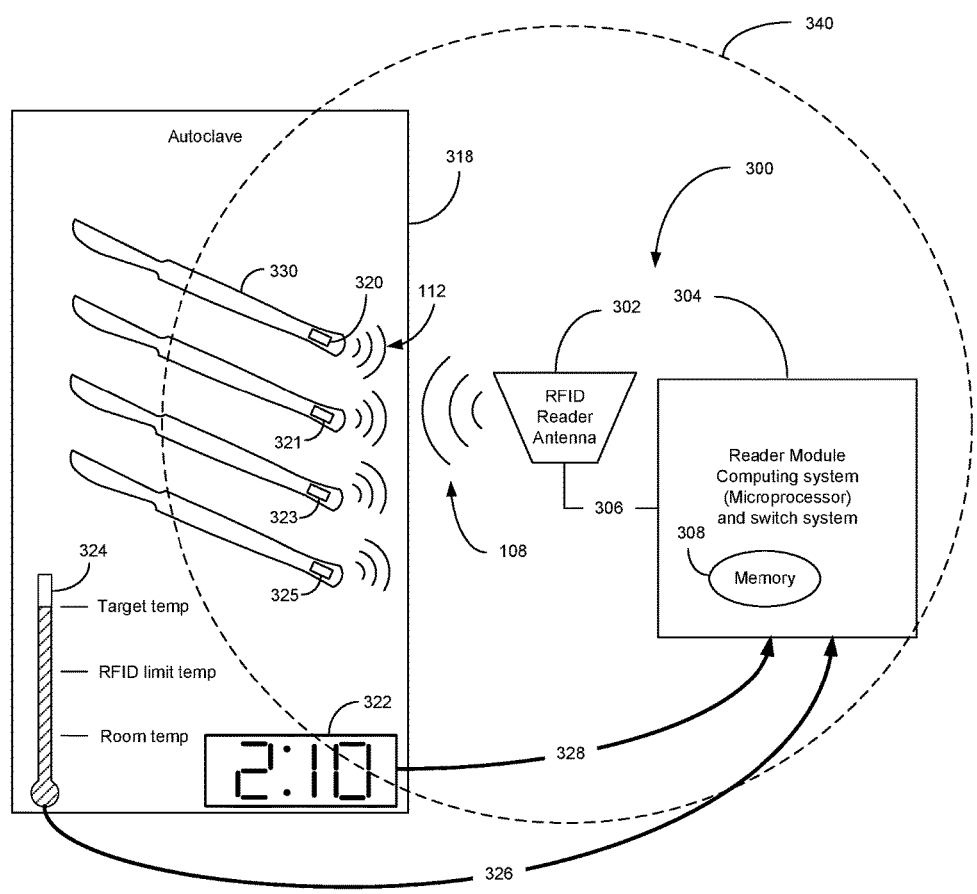

With reference to FIG. 2 and FIG. 3B, once the temperature of the of the autoclave 318 has reached the target temperature (the temperature that effectively destroys contaminants on the scalpels), the scalpels 330 are held in the target temperature environment inside of the autoclave 318 for a minimum amount of time, such as in this example two hours and ten minutes (2:10), depicted by the temperature display device 322. The target temperature that the RFID tags 320 are subjected to are beyond RFID tag functionality depicted by the lack of radio waves in the interrogation zone 340, step 202. In other words, the RFID tags 320 are inoperable to function properly at the elevated target temperature. Nonetheless, data/values such as temperature, time held at temperature, and/or other parameters measured by additional sensors 324 are transmitted, step 204, to the non-transitory memory 308 associated with the interrogator 300 (or computer memory accessible by/transferrable to the interrogator) and sensor 324, step 206. This is depicted by the time value 2:10 being transmitted by arrow 328 to the computing system 304 to be retained in non-transitory memory 308 and the target temperature measured from the temperature device 324 also transmitted by arrow 326 to the computing system 304 to be retained in the non-transitory memory of the reader module 308. Other embodiments contemplate collecting and retaining records of parameters and associated values measured in relation to the target temperature stored on memory elsewhere.

Figure 3C:
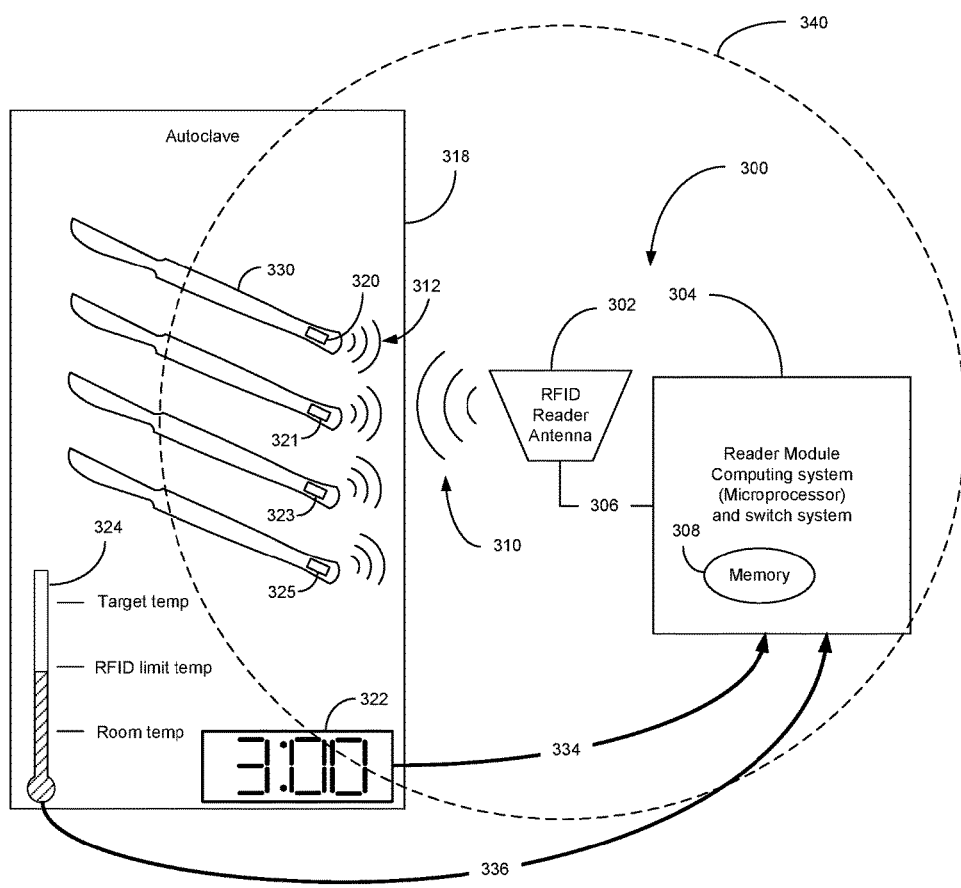

Once the scalpels 330 have been exposed to the elevated target temperature for the appropriate amount of time, the autoclave 318 is cooled back down to room temperature. When the autoclave 318 cools down to at least the RFID operating limit temperature, or the temperature in which the RFID tags 320 are operable, as depicted in FIG. 3C, data retained in the nonvolatile reader module memory 308 can then be transmitted via the RFID antenna 302 to the RFID tag memory 320. More specifically, the scalpels 330 and their respective attached RFID tags 320 are brought down to an RFID tag operable environment, step 208, because the RFID tags 320 will not work at any temperature above the operating limit temperature. Meanwhile, data values of measured parameters associated with the autoclave 318 can be transmitted from the autoclave 318 to the interrogator memory 308, such as via the time display 322 (3:00 transmitted 334) and the temperature sensor 324 (RFID limit temperature transmitted 336). Again, once in an operable environment, the RFID antenna 302 can transmit 108 the target temperature value, the amount of time the autoclave 318 was held at the target temperature, as well as other parameters measured and retained in the computer system nonvolatile memory 308, step 210. The RFID tags 320 when in communication 212 with the RFID antenna 302 receive the target temperature value and the time at target temperature and store that data in the RFID memory, step 312. At that point, it can be confirmed that the scalpels were indeed autoclaved at an appropriate target temperature for an appropriate amount of time to destroy biological contaminants.

From there on out each scalpel 330 can be interrogated with an RFID interrogator to determine if the scalpel 330 was disinfected under heat and for how long, potentially from what autoclave, on what date, by whom, etc. This data could be obtained in an operating room, in equipment stores, or elsewhere. Other embodiments contemplate sending additional information to each RFID sensor 320 with an RFID interrogator whenever a scalpel 330 leaves an equipment store, enters a surgery suite, exits a surgery suite, or passes through other barriers that would jeopardize the cleanliness of the scalpel 330.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms used herein. For example, though most of the embodiments are directed to a single inoperable environment, there may be multiple inoperable environments to which an RFID tag 320 is exposed whereby a variety of parameter values are taken while in the inoperable environment while still maintaining substantially the same functionality without departing from the scope and spirit of the present invention. Another example can include a variety of different tools or objects that undergo exposure to an extreme environment (where an RFID tag is rendered inoperable) whereby knowledge of the extreme environment to which the variety of different tools or objects are exposed is desirable to be obtained and recorded to the variety of different tools or objects while still maintaining substantially the same functionality without departing from the scope and spirit of the present invention. Moreover, though embodiments of the present invention described an object being immersed in an extreme environment, it is envisioned that only a portion of an object is exposed to an extreme environment with the RFID tag also is exposed to the extreme environment while still maintaining substantially the same functionality without departing from the scope and spirit of the present invention. Also, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed.

What is claimed is:

1. A sensing system comprising:
an RFID tag possessing nonvolatile RFID memory;
a sensor linked with an RFID interrogator system, the RFID interrogator system including a microprocessor, sensor reader, real time clock, timer, non-volatile interrogator memory and an RFID antenna, the non-volatile interrogator memory containing a value sensed by the sensor obtained while the RFID tag was disposed in a first environment that renders the RFID tag inoperable, the non-volatile RFID memory containing the value obtained from the RFID interrogator system only after the RFID tag was disposed in a second environment, the RFID tag operable in the second environment.

2. The sensing system of claim 1 wherein the first environment is at a high temperature that is too high for the RFID tag to operate and the second environment is at a low temperature that is within an operable temperature range for the RFID tag to operate.

3. The sensing system of claim 2 wherein the first environment is in an oven.

4. The sensing system of claim 1 further comprising a tool on which the RFID tag is attached.

5. The sensing system of claim 1 wherein the sensor is integrated in the RFID interrogator system.

6. The sensing system of claim 1 wherein the value is a peak temperature in a high temperature environment.

7. The sensing system of claim 1 further comprising a second sensor that senses a different parameter.

8. The sensing system of claim 1 wherein the RFID tag is attached to a tool, the first environment is inside of an autoclave, the tool inside of the autoclave, the value is peak temperature within the autoclave and/or an indication of time established by the timer above a critical temperature.

9. A method comprising:
providing a sensor, real time clock, and timer linked with an RFID interrogator system and an RFID tag possessing nonvolatile RFID memory;
exposing the RFID tag to a first environment that renders the RFID tag inoperable;
collecting a first sensor value of the first environment via the sensor;
storing the first sensor value in nonvolatile memory comprised by the RFID interrogation system;
exposing the RFID tag to a second environment that renders the RFID tag operable;
wirelessly transmitting the first sensor value from the RFID interrogator system to the RFID tag when the RFID tag is in the second environment; and
storing the first sensor value in the nonvolatile RFID memory while the RFID tag is in the second environment.

10. The method of claim 9 further comprising collecting a second sensor value in the second environment and storing the second sensor value in the nonvolatile RFID memory.

11. The method of claim 10 further comprising measuring an amount of time, with the timer, that the RFID tag is exposed to the first environment, making a record of the amount of time and storing the record to the nonvolatile RFID memory when the RFID tag is in an RFID operable environment.

12. The method of claim 9 further comprising exposing the sensor to the first environment and the second environment.

13. The method of claim 9 further comprising collecting a second sensor value in a third environment wherein the third environment render the RFID tag inoperable and storing the second sensor value to the RFID memory when the RFID tag is in a fourth environment wherein the fourth environment renders the RFID tag operable.

14. The method of claim 9 wherein the first environment is at a temperature above an operable limit of the RFID tag.

15. The method of claim 9 wherein the first environment has an electromagnetic noise level above an operable limit of the RFID tag.

16. The method of claim 9 wherein the sensor is comprised by the RFID interrogator system.

17. The method of claim 9 wherein the RFID tag is attached to a tool.

18. The method of claim 9 further comprising:
exposing a second RFID tag to the first environment that renders the second RFID tag inoperable;
exposing the second RFID tag to the second environment that renders the second RFID tag operable;
wirelessly transmitting the second sensor value to the second RFID tag via the RFID interrogator system while the second RFID tag is in the second environment; and
storing the second sensor value in second sensor nonvolatile RFID memory integrated with the second RFID tag while the second RFID tag is in the second environment.

19. A method comprising:
providing an RFID interrogator system including a sensor, a timer device;
providing at least one RFID tag possessing nonvolatile RFID memory;
measuring a parameter in a first environment via the sensor while the at least one RFID tag is in the first environment, the first environment rendering the at least one RFID tag inoperable;
storing the parameter in nonvolatile data memory accessible by the RFID interrogator system; and
transmitting the parameter to the nonvolatile RFID memory while the at least one RFID tag is in a second environment, the at least one RFID tag operable in the second environment.

20. The method of claim 19 further comprising:
disposing the at least one RFID tag on at least one tool;
immersing the at least one tool in the first environment;
immersing the at least one tool in the second environment;
storing a record of elapsed time measured by the timer device to said nonvolatile data memory; and
transmitting the record to the nonvolatile RFID memory while the at least one RFID tag is in the second environment.

* * * * *